United States Patent [19]

Struben

[11] 3,927,494
[45] *Dec. 23, 1975

[54] TENSIONABLE HOLD-DOWN ANCHORAGE APPARATUS

[75] Inventor: Francis L. Struben, Jarrettsville, Md.

[73] Assignee: Silver Top Manufacturing Co. Inc., White Marsh, Md.

[ * ] Notice: The portion of the term of this patent subsequent to Oct. 28, 1992, has been disclaimed.

[22] Filed: Nov. 1, 1974

[21] Appl. No.: 519,952

[52] U.S. Cl. .................. 52/23; 52/149; 52/157; 52/160
[51] Int. Cl.² .......................................... E04B 7/00
[58] Field of Search ....... 52/23, 148, 149, 295, 155, 52/157, 159, 160, 83, 150, 151, 156, 158, 161, 165, 446; 254/161; 24/243 CH, 243 AC, 243 E, 243 M, 265 CD, 269, 68, 71.2, 68 CD, 68 B; 248/361 A, 361 R, 119 R, 25; 280/179 A, 179 R; 105/369 A; 119/117, 121

[56] References Cited
UNITED STATES PATENTS

| 422,642 | 3/1890 | Sergeant | 119/117 |
| 1,153,450 | 9/1915 | Schaff | 52/155 |
| 1,252,645 | 1/1918 | Baier et al. | 24/71.2 |
| 1,582,454 | 4/1926 | Evans | 52/155 |
| 1,907,759 | 5/1928 | Durbin | 52/161 |
| 2,396,276 | 3/1946 | Lang | 52/161 |
| 2,812,743 | 11/1957 | Dustin | 119/121 |
| 3,371,902 | 3/1968 | Hartwick | 248/354 R |
| 3,747,288 | 7/1973 | Grimelii | 52/23 |
| 3,750,349 | 8/1973 | Deike | 52/23 |
| 3,754,733 | 8/1973 | Foster | 24/269 |
| 3,769,764 | 11/1973 | Young | 52/23 |
| 3,830,457 | 8/1974 | Stewart | 248/361 A |

Primary Examiner—Ernest R. Purser
Assistant Examiner—Robert Farber
Attorney, Agent, or Firm—Walter G. Finch

[57] ABSTRACT

The invention comprises an anchorage apparatus which is tensionable to secure mobile homes and other portable structures and the like against windloads. The present apparatus provides an anchoring rod having the lower portion thereof anchored in the earth or the like and having a threaded upper portion extending above the surface on which the object to be secured is disposed. A sleeve having a vertically-oriented U-shaped bracket fits over the threaded upper portion of the anchoring rod, the bracket having mounting bolts horizontally disposed therein to secure straps or cables which attach to the object to be secured. The sleeve is tensionably and adjustably secured to the anchoring rod by a nut threaded onto the threaded upper portion of the rod, the nut being tightened against the force exerted on the sleeve by the straps and/or cables secured by the U-shaped bracket carried on the sleeve. A spring carried on the rod absorbs vertical movements of the secured object such as are encounted in areas subject to "frost-heave".

7 Claims, 6 Drawing Figures

TENSIONABLE HOLD-DOWN ANCHORAGE APPARATUS

BACKGROUND OF THE INVENTION

A. Field of the Invention

The present invention relates to hold-down apparatus, and in particular, relates to apparatus which is especially adapted to hold down mobile homes or the like.

B. Description of the Prior Art

Structures such as mobile homes or temporary buildings are susceptable to damage from high winds due to their relatively light weight and relatively insecure foundations. In order to provide resistance to the wind loadings which occur at times in many geographical areas, it is desirable to "tie" such structures "down" in some manner. It is necessary to provide this increased windloading resistance without risk of damage to the structure from the devices employed to tie the structure down. To this end, vertical movements of the structure must be accommodated, particularly in areas subject to frost-heave. There are several types of apparatus presently employed to tie down mobile homes. One arrangement employs cable or flexible straps tied to concrete anchors. See, for example, U.S. Pat. No. 3,054,151 to Shankland. However, such arrangements generally require that the straps extend away from the vehicle in order to achieve maximum hold down capabilities (i.e. mechanical advantage). Yet in this configuration, the straps are in impediment to walking about the mobile home. Grinelli et al, in U.S. Pat. No. 3,335,531, teach a mobile home tie-down employing permanently installed spaced concrete anchors and a detachable rod frame. However, this arrangement is expensive; and since mobile homes come in various widths, the permanently installed concrete anchors may often be too wide, in which case the rods are a walking impediment, as described above, or too narrow, resulting in a loss in the overall strength of the tie-down assembly. Another technique, disclosed by Doctor In U.S. Pat. No. 3,403,487, contemplates a permanent concrete pad to which the mobile home is anchored. The present invention provides an anchoring holddown apparatus capable inter alia of accommodating a plurality of straps, cables or combinations of the two without sacrificing the ability to rapidly tension the straps and/or cables without the necessity for special tools.

SUMMARY OF THE INVENTION

This invention relates to the art of anchoring mobile homes, lightweight building structures, trailers and the like to the ground. While the invention may be utilized with a various number of structures, it is hereinafter described with its use in connection with mobile homes or other portable or temporary types of structures. The present invention comprises apparatus which provide stabilizing support and tie-down anchorage for mobile homes so that a force causing tension on one side of the mobile home will be offset by a compression resistance to this force on the other side of the home. A distribution of forces is provided so that stresses applied from any direction and to any portion of the mobile home will be distributed and balanced to prevent not only dislodgement of the mobile home from its foundation but also damage to the structure thereof.

The present invention includes ground anchor posts or rods which may be of the auger, cleat, or disc anchoring type, it being understood that the various well-known soil-engaging structures previously provided in the art may be employed without altering the effectiveness of the invention. In particular, the invention provides a strap and/or cable tensioning device which is attachable to the above-ground portion of an anchoring rod and which may be simply and efficiently adjusted thereon to tighten straps and/or cables attached thereto. The invention is capable of receiving a plurality of straps, cables, or combinations thereof and to tighten or bring such straps or cables under tension by a single mechanical operation which requires no special tools. Further, the invention aligns the straps and/or cables attached thereto without regard for the manner in which the anchoring rod is disposed in the earth or other securing medium. Effectively, as long as the anchoring post is oriented vertically, the present device automatically aligns with the straps and/or cable attached or secured to the mobile home to prevent binding of said straps and/or cables. The invention is further provided with spring means carried on the rod for accommodating vertical movements of a mobile home such as occur due to frost-heave.

Accordingly, it is an object of the invention to provide an anchorage apparatus for mobile homes and the like which increases the resistance of such structures to windloads.

It is a further object of the invention to provide a tensioning device on an anchoring rod, which device is capable of having a plurality of straps and/or cables attached thereto.

It is another object of the invention to provide a tensioning device capable of self-alignment with securing straps and/or cables attached thereto.

A still further object of the invention is to provide a tensioning device capable of compensating for vertical movements of mobile homes such as occur due to frost-heave.

Further objects and advantages of the invention will become more readily apparent in light of the following description of the preferred embodiment of the invention.

DESCRIPTION OF THE PREFERRED EMBODIMENT

Figure 2:
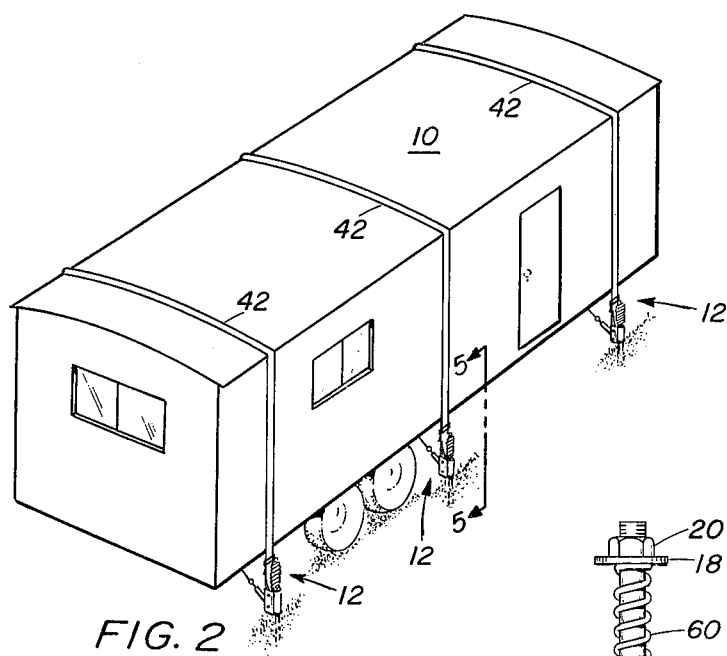
FIG. 2 is a perspective view illustrating the use of the invention to tie down a mobile home structure.

The intended environment of the present invention is best seen in FIG. 2 wherein a mobile home 10 is shown to be anchored or secured to the earth or to an alternate foundation medium on which the home 10 rests. Anchoring assemblies 12 embodying the present invention are seen in FIG. 2 to be partially embedded in the earth immediately below and beside the mobile home 10. Each assembly 12 is seen to have a strap 42 and a cable 40 attached thereto, the strap 42 extending vertically to contact a vertical surface of the home 10 and to wrap around said home to a point of attachment on the opposite side of the home. The cable 40 extends to a point of attachment on the understructure of the home 10 in a manner to be described hereinafter.

Figure 1:
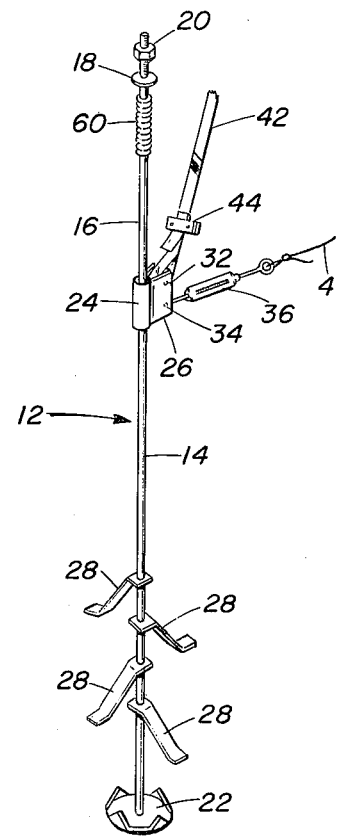
FIG. 1 is a perspective view of the invention shown in a fully assembled configuration.

One of the assemblies 12 is shown more clearly in FIG. 1 and is seen to comprise an anchor rod 14 having an upper threaded end portion 16 onto which a washer 18 and nut 20 are received. A bottom plate 22 is fixed on the opposite end of the rod 14. The plate 22, in concert with anchoring arms 28 disposed on the rod in spaced fashion above said plate, anchors the rod 14 into the earth in a manner to be described hereinafter. The assembly 12 further comprises a cylindrical sleeve 24 receivable onto the threaded upper portion 16 of the rod 14, the sleeve 14 being loosely received thereon such that said sleeve is slidable on and rotatable about the rod. The sleeve 24 has a U-shaped bracket 26 attached thereto, the trough-like U-shaped portion of the bracket being vertically oriented with respect to the earth. As is shown best in FIG. 6, moutning bolts 32 and 34 are horizontally disposed in the bracket 26, the bolt 32 having the strap 42 connected thereto and the bolt 34 having the cable 40 connected thereto.

Figure 6:
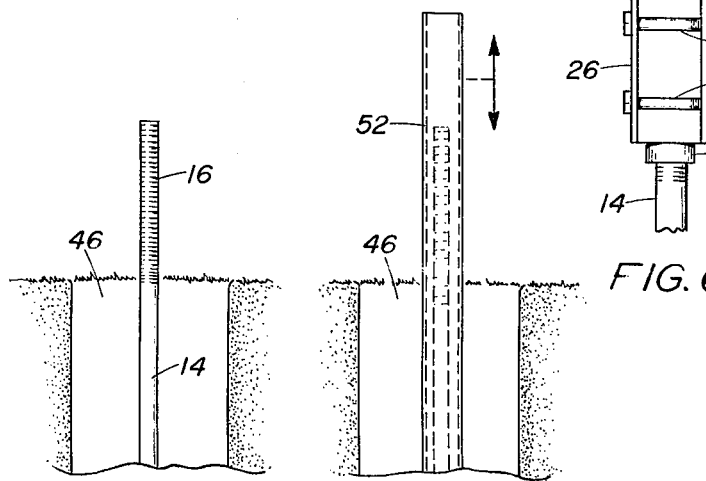
FIG. 6 is an elevational view of the tensioning mechanism of the invention shown in an assembled configuration.
Figure 5:
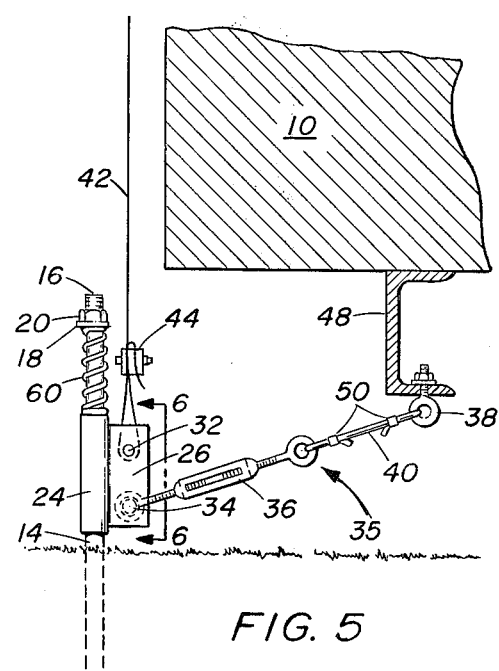
FIG. 5 is a sectional view taken through line 5—5 of FIG. 2.

As can be seen most clearly in FIGS. 1, 5, and 6, a spring 60 is provided on the rod 14 between the uppermost portion of the sleeve 24 and the underside of the washer 18. The spring 60 is of the coil type and, being cylindrical in configuration, slips over the rod 14 to a desired position surmounting and abutting on one end thereof the uppermost portion of the sleeve 24. The nut 20 maintains the washer 18 in tensionable relation with the spring 60 and the sleeve 24. Although the invention may be practiced without the spring 60, it is desirable to provide the spring 60 in the present structure in those geographical areas where tied-down structures are subject to frost-heave or other vertical motions. Conditions of this nature often damage the roof of the tied-down mobile home as the home is moved vertically upward against the restraints of the straps 42. The spring 60 is of a compression rate, i.e., the spring is chosen to have a desired spring constant, sufficient to allow a pre-determined absorption of vertical movement of the tied-down structure without damage to the structure. The magnitude of movement allowed by the spring 60 may be determined in a known fashion by judicious choice of the spring constant, the free length of the spring, and the durability of the roof portions of the tied-down structure. It is to be understood however that the present structure may function adequately in most areas and at most times without the spring 60.

Figures 3, 4:
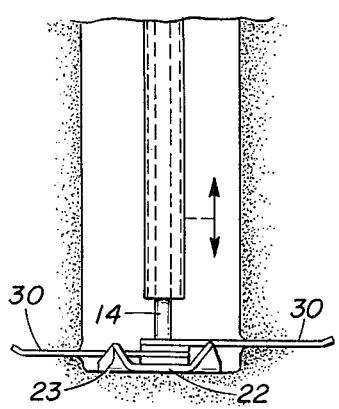
FIG. 3 is an elevational view showing a first step in the installation of the anchoring post of the invention.
FIG. 4 is an elevational view showing a second step in the installation of the anchoring post of the invention.

Referring now to FIGS. 3 and 4, the first steps of installation of the assembly 12 of the invention are shown. After excavation of a hole 46 in the earth in a position immediately below and beside a structure to be secured to the earth, such as the mobile home 10 in FIG. 2, the rod 14 is placed in the hole 46 with the bottom plate 22 contacting and resting against the bottom of the hole. The anchoring arms 28 rest in a substantially vertical position when first placed in the hole 46. Through the use of a pipe tool 52, the uppermost portions of the anchoring arms 28 are contacted by the lower end portion of the tool 52, the tool 52 sliding over the rod 14 into contact with the arms 28. By exerting a substantial downwardly directed force on the uppermost portions of the arms 28, the arms 28 are extended outwardly and into contact with the side walls of the hole 46, the arms burrowing into the soil at positions 30 to anchor the rod 14 into the earth. The bottom plate 22 is also provided with points 23 which further act to secure the rod 14 into the earth on filling of the hole 46. The pipe tool 52 is removed on extension of the arms 28 and the hole 46 is back-filled in any well-known fashion, at least the threaded upper portion 16 of the rod 14 extending above the surface of the earth. Care is taken to dispose the rod 14 in a vertical orientation to the surface of the earth in a well-known fashion.

As seen in FIGS. 1, 6, and particularly in FIG. 5, the upper portion 16 of the rod 14 receives the sleeve 24, the bracket 26 being carried thereon as described above. The sleeve 24 is seen in FIG. 5 to be disposed near the surface of the earth immediately below and beside the home 10. The strap 42 and the cable 40 are attached to the home 10 at first ends thereof and to the assembly 12 at the other ends thereof. The bolt 32 in the uppermost portion of the bracket 26 mounts the strap 42 and the bolt 34 mounts the cable 40. The end of the strap 42 loops about the bolt 32 and is fastened against the body of the strap by a clamp 44. The cable 40 loops at its inner end about the eye of a ring bolt 38 which is mounted on a portion of the frame 48 on the underside of the home 10. The other end of the cable 40 loops about the eye of a ring screw forming a portion of turnbuckle assembly 35, the looped ends of the cable being secured by clamps 50. The eye portion on the opposite end of the turnbuckle assembly 35 mounts on the bolt 34, the cable 40 being tensionable between the assembly 12 and the mobile home 10 by manipulation of turnbuckle 36.

The sleeve 24 and bracket 26 carried thereby is secured on the rod 14 by means of the nut 20 and washer 18, either with or without the spring 60 being located therebetween. The nut 20 is tightened onto the upper portion 16 of the rod 14 by virtue of the threaded engagement between the nut 20 and the portion 16. Thus, the sleeve 24 is forced downwardly under the bias of the nut 20 until the strap 42 is brought into a desired tension. The cable 40 can also be tensioned by the nut 20 although the turnbuckle 36 is more effectively utilized to produce the desired tension thereon. As can be seen in FIG. 5, vertical motion of the strap 42 is accommodated by the spring 60, since the sleeve 24 is allowed to move upwardly on the rod 14 under a compressive force exerted by the spring 60.

It should be pointed out that the structure of the bracket 26 allows attachment of a plurality of straps such as 42 or of cables such as 40. In addition, combinations of straps and cables may also be received by the structure as shown. A further benefit of the present structure is that the sleeve 24 is rotatable with respect to the vertical axis of the rod 14 to adjust to the proper facing orientation with respect to the object being held down by the assembly 12. Thus, the bracket 26 may align with the strap 42 and cable 40 without the need for prealignment of the rod 14 on installation thereof into the hole 46.

The invention may be practiced other than in the fashion specifically described above without departing from the intended scope of the invention. Accordingly, the invention is to be limited only by the recitation of structure to be found in the claims appended hereto.

I claim:

1. Apparatus for tensionably securing an object to the earth or the like, comprising:
   rod means fixedly engageable with the earth and having a portion thereof extending thereabove;
   sleeve means slidable onto that portion of the rod means which extends above the surface of the earth, the sleeve means further being rotatable about the vertical axis of the rod means;
   bracket means carried on the sleeve means;
   said bracket means comprising a U-shaped channel having the longitudinal axis thereof parallel to the longitudinal axis of said rod means;
   mounting means disposed in the bracket means;
   securing means engageable at a first end thereof with the object to be secured and attachable at a second end thereof to the mounting means in said bracket means;
   means for adjustably positioning the sleeve means on the rod means to tension the securing means between the object and the mounting means;
   spring means disposed on the rod means between the sleeve means and the means for adjustably positioning the sleeve means acting to accommodate vertical motions of the object to be secured; and
   earth anchoring means disposed on the rod means for engaging the earth and anchoring the rod means thereto, said anchoring means including a bottom base attached to the lower end of said rod means, and a plurality of spaced anchoring means disposed on said rod means in spaced fashion above said base and spreadable about the periphery of said rod means for anchoring said rod means in said earth.

2. The apparatus of claim 1 wherein the portion of the rod means extending above the surface of the earth is threaded and wherein the means for adjustably positioning the sleeve means comprises a threaded nut receivable onto and mating with said threaded portion of the rod means so that the sleeve means may be biased along the rod means by tightening the nut against the sleeve means.

3. The apparatus of claim 1 wherein the mounting means comprise spaced bolts mounted in the channel of the bracket means and disposed normal to the longitudinal axis of the rod means.

4. The apparatus of claim 3 wherein said securing means comprise strap means fixedly engaged with at least one of the bolts.

5. The apparatus of claim 3 wherein said securing means comprise cable means fixedly engaged with at least one of the bolts.

6. The apparatus of claim 3 wherein said securing means comprise strap means fixedly engaged with at least one of the bolts and cable means fixedly engaged with at least one other of the bolts.

7. The apparatus of claim 5 wherein said cable means is provided with turn-buckle means disposed between the point of attachment thereof to the object and the bolt mounted in the channel of the bracket means for tensioning the cable means.

* * * * *